(12) United States Patent
Tylutki et al.

(10) Patent No.: US 10,611,332 B2
(45) Date of Patent: Apr. 7, 2020

(54) COLLAPSIBLE FLUID RESERVOIR IN A VEHICLE FOR PEDESTRIAN PROTECTION

(71) Applicant: Ford Global Technologies, LLC, Dearborn, MI (US)

(72) Inventors: Daniel Robert Tylutki, Livonia, MI (US); Robert Alex Mitchell, Plymouth, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 216 days.

(21) Appl. No.: 15/696,441

(22) Filed: Sep. 6, 2017

(65) Prior Publication Data
US 2019/0071049 A1  Mar. 7, 2019

(51) Int. Cl.
*B60R 21/34* (2011.01)
*B60K 11/04* (2006.01)
*B60K 11/02* (2006.01)

(52) U.S. Cl.
CPC .............. *B60R 21/34* (2013.01); *B60K 11/02* (2013.01); *B60K 11/04* (2013.01); *B60R 2021/343* (2013.01); *B60Y 2410/113* (2013.01)

(58) Field of Classification Search
CPC ... B60R 21/34; B60R 2021/343; B60K 11/04; B60K 2015/0675; B60Y 2410/113; B60S 1/50
See application file for complete search history.

(56) References Cited

U.S. PATENT DOCUMENTS

| | | | | |
|---|---|---|---|---|
| 4,919,226 A | * | 4/1990 | Rana | B60K 15/063 180/274 |
| 6,447,049 B1 | * | 9/2002 | Tohda | B60R 19/12 296/180.1 |
| 6,802,556 B2 | | 10/2004 | Mattsson et al. | |
| 7,374,145 B2 | * | 5/2008 | Ohashi | B60R 21/34 248/562 |
| 7,849,559 B2 | | 12/2010 | Lindmark et al. | |
| 8,486,173 B2 | | 7/2013 | Fikany et al. | |
| 9,221,387 B1 | * | 12/2015 | Thorpe | B60Q 1/0491 |

(Continued)

FOREIGN PATENT DOCUMENTS

| | | |
|---|---|---|
| CN | 101080460 A | 11/2007 |
| CN | 101214806 A | 7/2008 |

(Continued)

*Primary Examiner* — Barry Gooden, Jr.

(57) ABSTRACT

A collapsible fluid reservoir capable of being displaced from its operational position during normal vehicle use to a position that is pushed out of the Pedestrian Protection Zone in an impact event is provided. The reservoir is attached to the body structure by a hinge assembly and a breakaway connector. The hinge assembly may be one of various structures that allow the reservoir to pivot away from the operational position in an impact event without allowing the reservoir to become completely detached from the body structure. The reservoir may include upper and lower portions or may be of one piece construction. Support arms are attached to the reservoir. The arms may be integrally formed with the portion. The hinge assembly may be one of a living hinge, a C-clip assembly and a ball-and-socket assembly. The breakaway connector may be a pin or a flange having a relatively thin breakaway area.

14 Claims, 7 Drawing Sheets

(56) References Cited

U.S. PATENT DOCUMENTS

| | | | | |
|---|---|---|---|---|
| 2004/0238247 A1* | 12/2004 | Ohashi | ............... | B60R 21/34 180/69.2 |
| 2006/0072332 A1* | 4/2006 | Arlon | ............... | B60Q 1/0491 362/509 |
| 2008/0238143 A1* | 10/2008 | Geyrhofer | ............... | B60S 1/50 296/187.03 |
| 2009/0008180 A1* | 1/2009 | Stefanelli | ............... | B60K 11/04 180/229 |
| 2009/0085374 A1* | 4/2009 | Takei | ............... | B60R 21/34 296/187.09 |
| 2011/0209935 A1* | 9/2011 | Nantais | ............... | B60K 11/04 180/68.4 |
| 2015/0091328 A1* | 4/2015 | Pugh-Jones | ............... | B60R 19/52 296/187.04 |
| 2015/0283895 A1* | 10/2015 | Takahashi | ............... | B60K 6/40 180/291 |
| 2016/0146093 A1* | 5/2016 | Takahashi | ............... | F01P 11/029 165/104.32 |
| 2017/0167712 A1* | 6/2017 | Melzner | ............... | F21V 29/58 |
| 2017/0274758 A1* | 9/2017 | Cho | ............... | B60K 6/22 |
| 2018/0339674 A1* | 11/2018 | Mitchell | ............... | B60R 21/34 |
| 2018/0347446 A1* | 12/2018 | Han | ............... | F01P 7/02 |

FOREIGN PATENT DOCUMENTS

| | | | | |
|---|---|---|---|---|
| CN | 101300300 | A | 11/2008 | |
| CN | 101309939 | A | 11/2008 | |
| CN | 102002213 | A | 4/2011 | |
| CN | 102657426 | A | 9/2012 | |
| EP | 1568578 | A1 | 8/2005 | |
| EP | 2036787 | A2 * | 3/2009 | ............ B60R 21/34 |
| FR | 2847205 | A1 | 5/2004 | |
| FR | 2987335 | A1 | 8/2013 | |

\* cited by examiner

COLLAPSIBLE FLUID RESERVOIR IN A VEHICLE FOR PEDESTRIAN PROTECTION

TECHNICAL FIELD

The disclosed inventive concept relates generally to pedestrian protection systems for automotive vehicles. More particularly, the disclosed inventive concept relates to a pedestrian protection system that includes a coolant system having a collapsible fluid reservoir in the form of a bottle or tank that is held in position during normal vehicle operation but that allows for the coolant reservoir to be moved out of the Pedestrian Protection Zone in an impact event, thus ensuring the safety of pedestrians.

BACKGROUND OF THE INVENTION

Increased attention is being given the world over to pedestrian-vehicle impacts as more vehicles appear on the roadways, particularly in developing countries. As a consequence, government studies related to the protection of pedestrians in vehicle impact events are also increasing. For example, pedestrian protection has become a goal of the United Nations Economic Commission for Europe. The UNECE advanced a proposal "to develop a global technical regulation concerning the protection of pedestrians and other vulnerable road users in collision with vehicles and final report on the development of the global technical regulation concerning pedestrian safety." Along with the Global Technical Regulation No. 9 (GTR-9), the European New Car Assessment Programme (Euro NCAP) developed a pedestrian protection star rating system. Vehicle manufacturers must meet child head, adult head, upper leg and lower leg test requirements provided to assess vehicle designs for mitigation of pedestrian injury caused by a vehicle frontal impact.

To reduce pedestrian injuries and to meet current and emerging global safety regulations, automotive companies are implementing Pedestrian Protection Systems. These systems often require additional space under the vehicle's engine hood that either avoid the provision of engine or engine-related components in the Pedestrian Protection Zone or provide for breakaway components that fall out of the zone in an impact event.

Often engine cooling components are, of necessity, located in or near the Pedestrian Protection Zone and are subject to the applicable safety requirements in their design criteria. The coolant reservoir is typically packaged just below the vehicle's engine hood, thus allowing convenient access for coolant fills. This location frequently places the coolant reservoir within the Pedestrian Protection Zone below the engine hood. This situation becomes more complicated as it is desired for the reservoir to be located near the front of the vehicle. Because the gap between the underside of the engine hood and the under-hood components typically reduces toward the front of the vehicle, the coolant reservoir, being typically placed vehicle-forward, is a component that often presents challenges to under-hood component placement and design.

As in so many areas of vehicle technology, there is room for improvement related to the protection of pedestrians in a pedestrian-vehicle impact event.

SUMMARY OF THE INVENTION

The disclosed inventive concept overcomes the problems of known technology by providing a collapsible fluid reservoir capable of being displaced from its operational position during normal vehicle use to a position that is pushed out of the Pedestrian Protection Zone in an impact event. The collapsible fluid reservoir of the disclosed inventive concept, typically a coolant reservoir, is attached to the vehicle body structure by a hinge assembly and a breakaway connector. In an impact event, the collapsible fluid reservoir is pushed whereby the breakaway connector is broken and the collapsible fluid reservoir is allowed to pivot by its hinge assembly from its operational position to a position out of the Pedestrian Protection Zone ensuring the safety of pedestrians.

The reservoir may include an upper portion and a lower portion or may be of one piece construction. At least first and second arms extend from the reservoir. The arms may be integrally molded with the reservoir.

The hinge assembly may be one of a number of structures that allow the reservoir to pivot away from the operational position in an impact event without allowing the reservoir to become completely detached from the body structure. In one embodiment of the hinge assembly, a pin attached to either the body support structure or the first arm and a pin-fitting, C-clip snap feature attached to the other of the first arm or the system support structure. The pin-fitting, C-clip snap feature is rotatably snapped onto the pin. In another embodiment of the hinge assembly, a ball is attached to one of the system support structure or the first arm and a socket is attached to the other of the first arm or the system support structure. The ball is rotatably attached to the socket. In a further embodiment of the hinge assembly, a living hinge is integrally formed from the first arm and a support structure extension is flexibly attached to the first arm and is fixedly attached to the body structure.

The breakaway connector may be one of a number of structures that allow the reservoir to be broken away from its operational position to a position out of the Pedestrian Protection Zone. In one embodiment of the breakaway connector, a breakaway flange is connected to the second arm and a breakaway pin attaches the flange to the support structure. The breakaway pin has a relatively thin breakaway neck. In another embodiment of the breakaway connector, a breakaway tab has a first end connected to the second arm and a second end connected to the body support structure. The breakaway tab also includes a breakaway pinched point that joins the breakaway tab to the second arm. In a further embodiment of the breakaway connector, an attachment arm and a breakaway pin are provided. The attachment arm extends from one or the other of the second arm or the support structure. The breakaway pin has a relatively thin breakaway neck and is attached to the other of the second arm or the support structure.

The above advantages and other advantages and features will be readily apparent from the following detailed description of the preferred embodiments when taken in connection with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention wherein.

DETAILED DESCRIPTION OF THE PREFERRED EMBODIMENT

Figure 1:
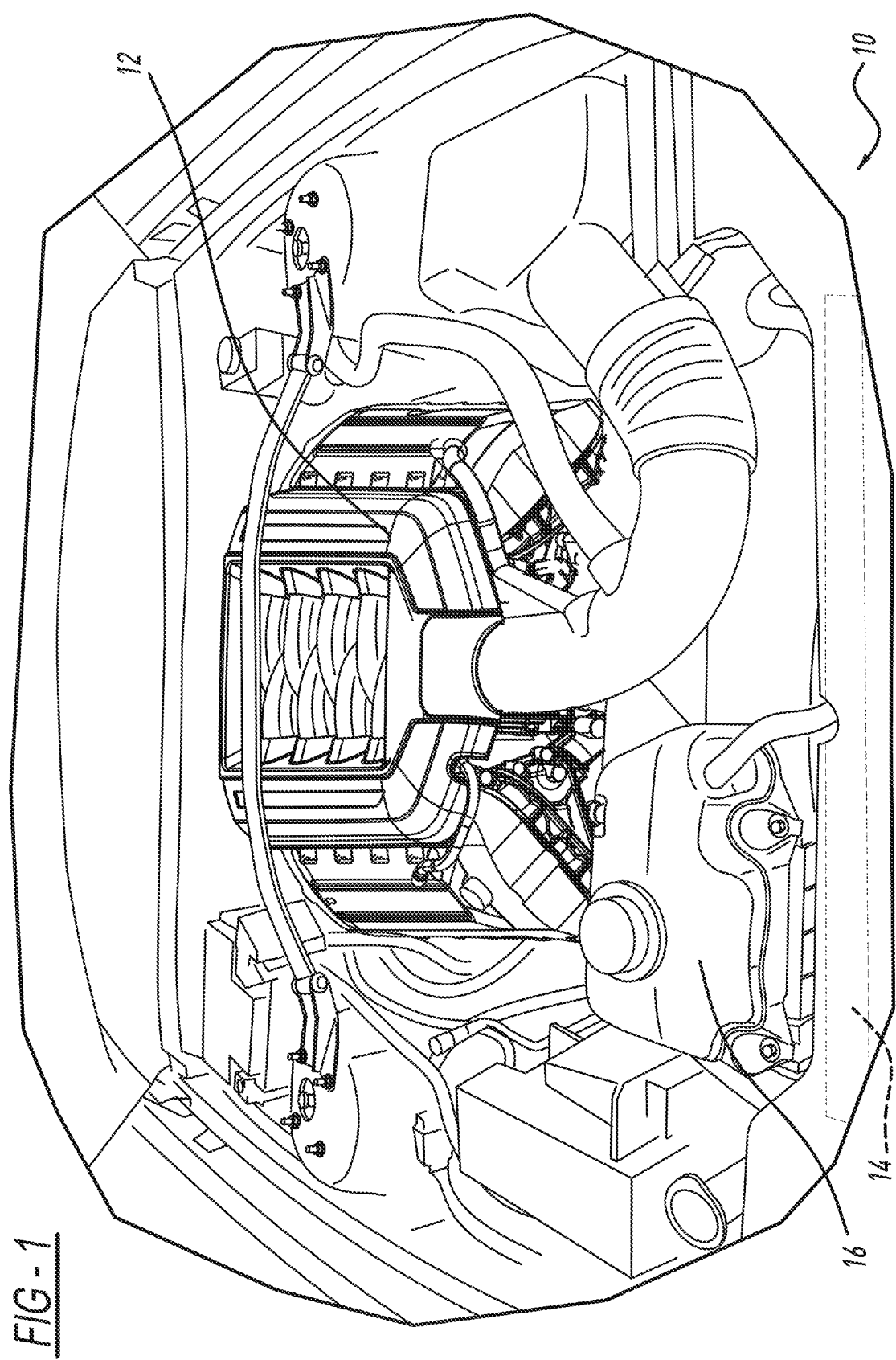
FIG. 1 is an environmental view of engine compartment of an automobile according to the prior art.

In the following figures, the same reference numerals will be used to refer to the same components. In the following description, various operating parameters and components are described for different constructed embodiments. These specific parameters and components are included as examples and are not meant to be limiting.

The accompanying figures and the associated description illustrate the collapsible fluid reservoir cover according to the disclosed inventive concept. It is to be understood that the shape, size, and position of the collapsible fluid reservoir as illustrated in the figures are suggestive and are not intended as being limiting. As a non-limiting example, the illustrated shape of the collapsible fluid reservoir is shown as being generally rectangular but may be adapted as needed for a certain space. As a further non-limiting example, the collapsible fluid reservoir may have an irregular shape that is specifically designed for installation in a given space in the vehicle's engine compartment.

Referring to FIG. 1, an environmental view of an engine compartment 10 is illustrated. Within the engine compartment 10 are located an engine 12, a radiator 14 illustrated in broken lines, and a collapsible fluid reservoir 16 according to the disclosed inventive concept. The number, placement and shapes of the components within the engine compartment 10 may be varied from those illustrated in FIG. 1 without deviating from the scope of the disclosed inventive concept.

The position of the collapsible fluid reservoir 16 illustrated in FIG. 1 is the position the collapsible fluid reservoir 16 would have under normal operating circumstances. As illustrated, the collapsible fluid reservoir 16 is within the Pedestrian Protection Zone. In an impact event, the collapsible fluid reservoir 16 would be pushed downward and out of the Pedestrian Protection Zone, thereby reducing injury to a pedestrian.

Movement of the collapsible fluid reservoir from its normal position illustrated in FIG. 1 to a position out of the Pedestrian Protection Zone in an impact event is made possible by the combination of the hinge assembly and breakaway connector formed by drop or break mounts. The various embodiments of these arrangements are illustrated in FIGS. 2 through 8. The hinge assembly and the breakaway connector are illustrated in various embodiments in FIGS. 2 through 8 and it is to be understood that the collapsible fluid reservoir of the disclosed inventive concept may incorporate any combination of the mount styles identified herein.

Figure 2:
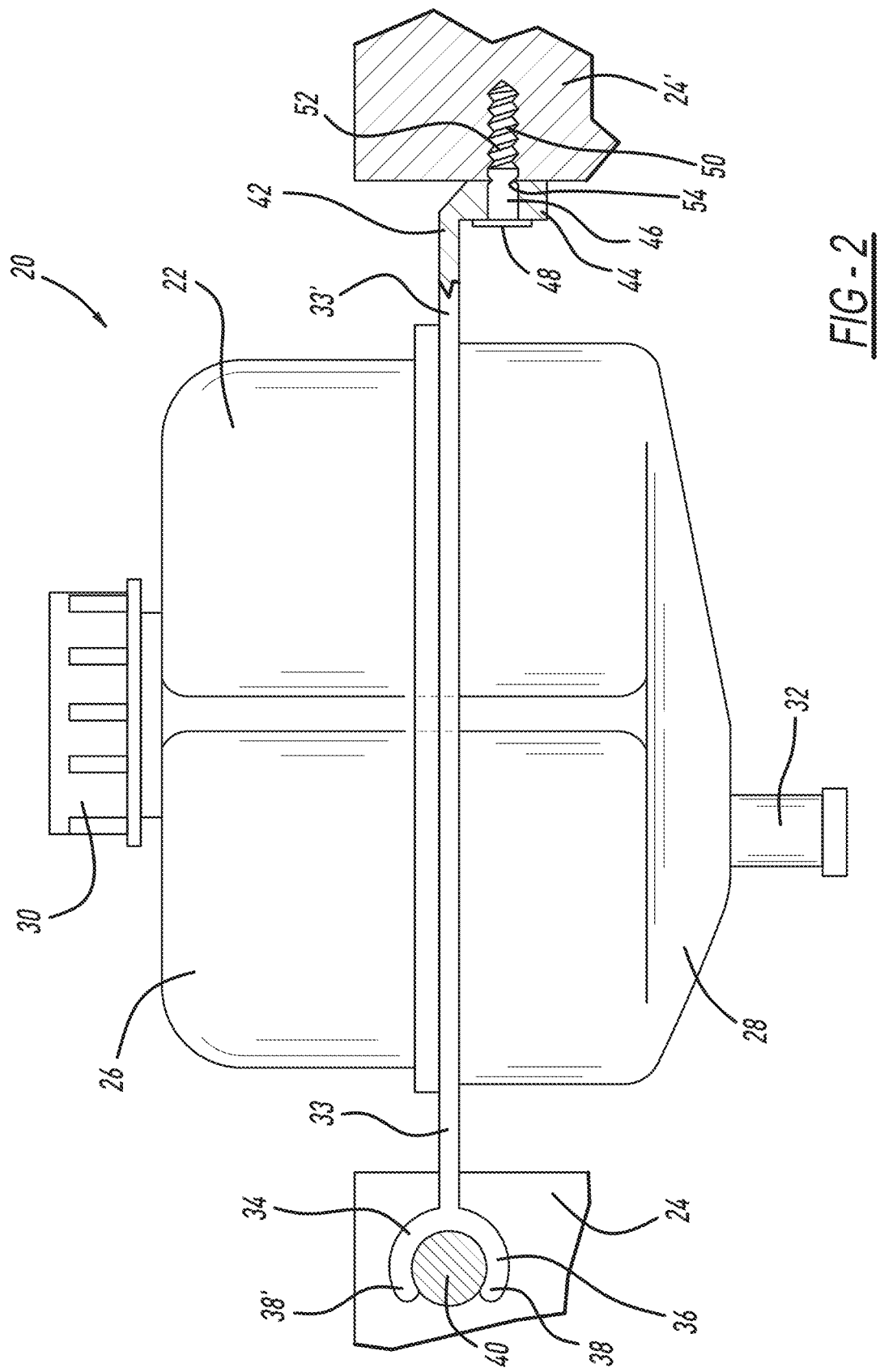
FIG. 2 is a side view of a collapsible fluid reservoir assembly according an embodiment of the disclosed inventive concept having a hinged side that includes a snap-in hinge attached to a pin attached to a vehicle body structure and a breakaway side that includes a breakaway pin attaching the reservoir to a vehicle body structure.

Referring to FIG. 2, a side view of a collapsible fluid reservoir assembly according to an embodiment of the disclosed inventive concept is illustrated generally as 20. The collapsible fluid reservoir assembly 20 includes a collapsible fluid reservoir 22 shown in relation to fixed vehicle body support structures 24 and 24'. The vehicle body support structures 24 and 24' may be any of several support structures that include, without limitation, the radiator or the inner surface of the wheel well.

The collapsible fluid reservoir 22 may be of a variety of constructions. For example, the collapsible fluid reservoir 22 may include an upper portion 26 and a lower portion 28 attached to the upper portion 26 by known methods such as welding or adhesives. The collapsible fluid reservoir 22 may alternatively be of one-piece construction formed by, for example, blow molding. A reservoir fill inlet 30 is formed as part of the upper portion 26 while a fluid drain 32 is formed as part of the lower portion 28.

A pair of integrally molded arms 33 and 33' extend from the sides of the collapsible fluid reservoir 22. The arms 33 and 33' are illustrated as being formed as part of the lower portion 28 but may alternatively be part of the upper portion 26 or part of both the upper portion 26 and the lower portion 28. The arms 33 and 33' are attached to the collapsible fluid reservoir 22 and may be integrally formed therewith or may be fastened thereto by, for example, mechanical fasteners (not shown).

As with all of the embodiments shown in the accompanying figures and discussed herein, the collapsible fluid reservoir assembly 20 includes both a hinge assembly for hinged attachment to a vehicle body structure and a breakaway connector that allows the fluid reservoir to be dropped or broken from a vehicle body structure. Particularly, and as illustrated in FIG. 2, at least one hinge assembly 34 is provided that includes a C-clip snap portion 36 defined by a pair of resilient opposed arms 38 and 38'. The C-clip snap portion 36 is attached to the arm 33. The C-clip snap portion 36 is rotatably attached to an elongated pin or rod 40 that is connected to the vehicle body support structure 24. The arrangement of the C-clip snap portion 36 with respect to the rod 40 allows for rotation of the C-clip snap portion 36 to be rotated on the rod 40.

The collapsible fluid reservoir assembly 20 further includes at least one breakaway assembly 42. The breakaway assembly 42 includes a flange 44 that, in its operational position, abuts the fixed vehicle body support structure 24'. A breakaway fastener such as a breakaway push pin 46 attaches the flange 44 to the fixed vehicle body support structure 24'. The breakaway push pin 46 includes a head 48 and an elongated fastening part 50 extending from the head 48. The elongated fastening part 50 is inserted into a fastener bore 52.

A relatively thin breakaway neck 54 is formed on the elongated fastening part 50 of the breakaway push pin 46.

The thickness of the breakaway neck 54 may be tuned such that a specific load is required to break the breakaway neck 54.

Figure 3:
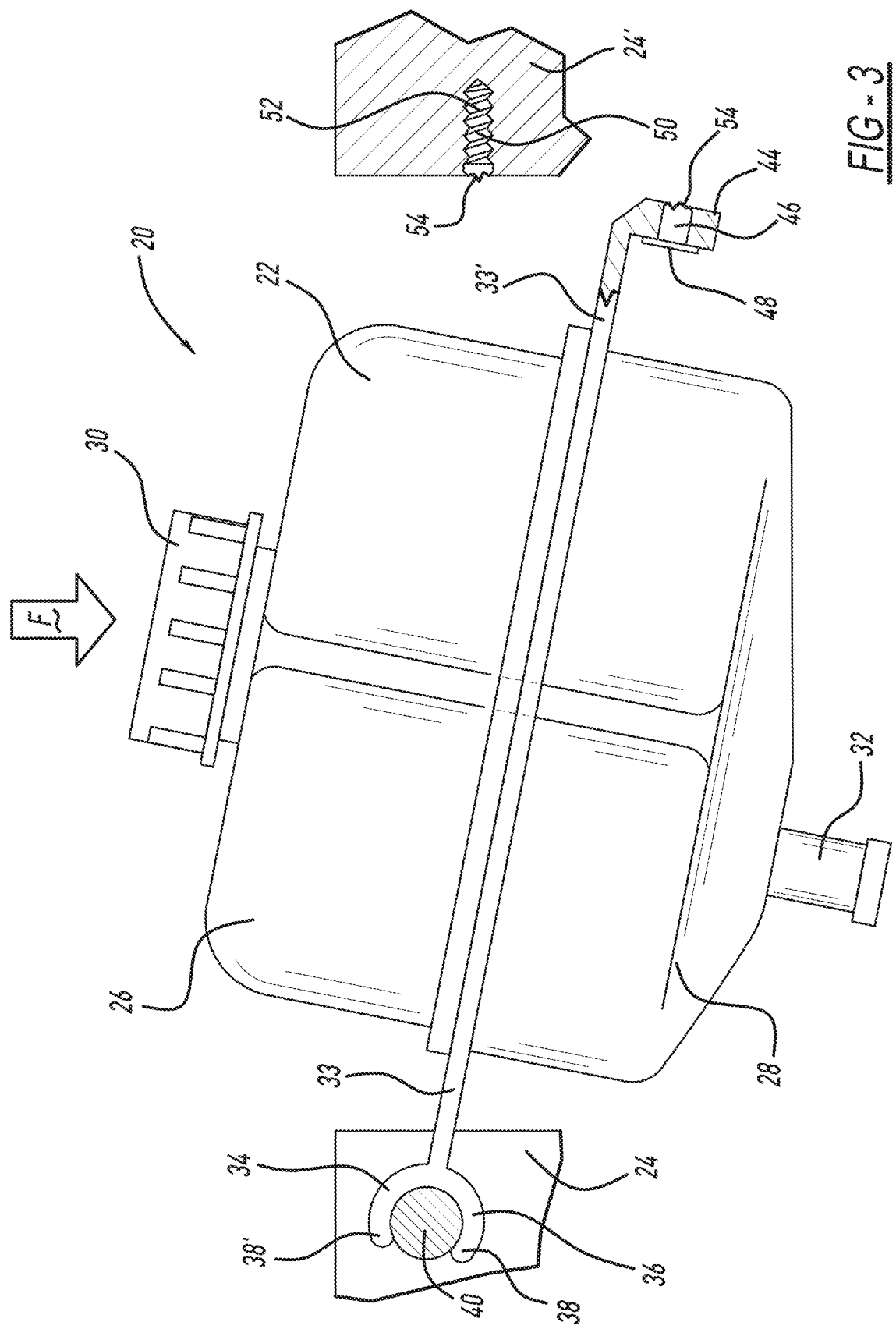
FIG. 3 is a view of the collapsible fluid reservoir assembly similar to that of FIG. 2, but illustrating the assembly following an impact event.

In an impact event, the collapsible fluid reservoir 22 is pushed out of its operational, pre-impact event position within the Pedestrian Protection Zone as illustrated in FIG. 2 to a position outside of the Pedestrian Protection Zone. This latter position is illustrated in FIG. 3 in which a force F has been applied to the collapsible fluid reservoir assembly 20 causing the breakaway push pin 46 to break at its breakaway neck 54 thereby freeing the collapsible fluid reservoir 22 on its one side. Thus disconnected from the fixed vehicle body support structure 24', the collapsible fluid reservoir 22 rotates on the hinge assembly 34 to the post-impact position illustrated in FIG. 3.

Figure 4:
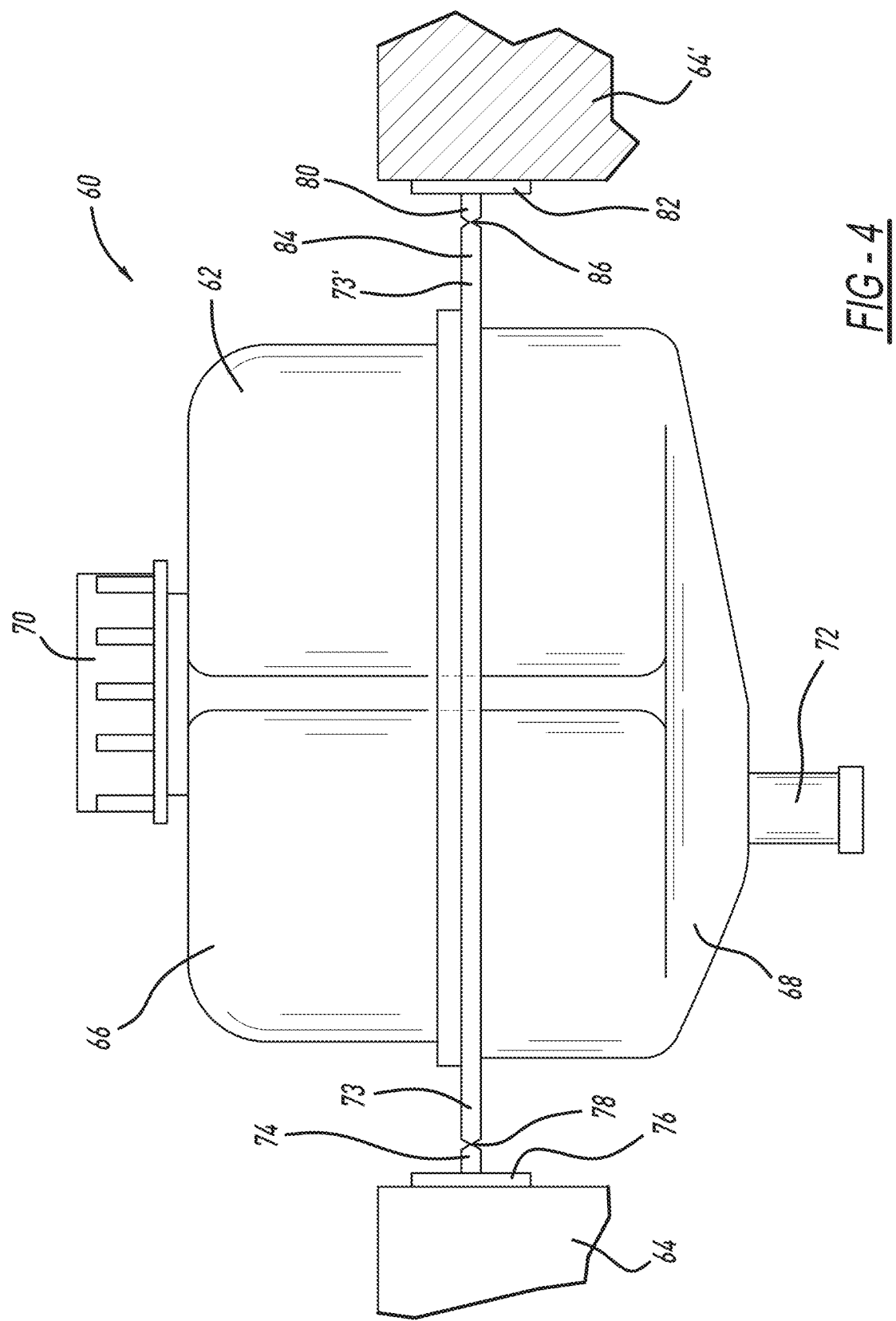
FIG. 4 is a side view of an collapsible fluid reservoir assembly according another embodiment of the disclosed inventive concept having a hinged side that includes a living hinge attached to a vehicle body structure and a breakaway side that includes a breakaway tab attaching the reservoir to a vehicle body structure.

Referring to FIG. 4, a side view of a collapsible fluid reservoir assembly according to an additional embodiment of the disclosed inventive concept is illustrated generally as 60. The collapsible fluid reservoir assembly 60 includes a collapsible fluid reservoir 62 shown in relation to fixed vehicle body support structures 64 and 64'. The vehicle body support structures 64 and 64' may be any of several support structures that include, without limitation, the radiator or the inner surface of the wheel well.

Like the collapsible fluid reservoir 22 shown in FIGS. 2 and 3 and discussed in conjunction therewith, the collapsible fluid reservoir 62 may be of a variety of constructions. For example, the collapsible fluid reservoir 62 may include an upper portion 66 and a lower portion 68 attached to the upper portion 66 by known methods such as welding or adhesives. Also like the collapsible fluid reservoir 22, the collapsible fluid reservoir 62 may be of one-piece construction formed by, for example, blow molding. A reservoir fill inlet 70 is formed as part of the upper portion 66 while a fluid drain 72 is formed as part of the lower portion 68.

A pair of integrally molded arms 73 and 73' extend from the sides of the collapsible fluid reservoir 62. The arms 73 and 73' are illustrated as being formed as part of the lower portion 68 but may alternatively be part of the upper portion 66 or part of both the upper portion 66 and the lower portion 68. The arms 73 and 73' are attached to the collapsible fluid reservoir 62 and may be integrally formed therewith or may be fastened thereto by, for example, mechanical fasteners (not shown).

Like the embodiment of the collapsible fluid reservoir assembly shown in FIGS. 2 and 3, the collapsible fluid reservoir assembly 60 includes both a hinge assembly for hinged attachment to a vehicle body structure and a breakaway connector that allows the fluid reservoir to be dropped or broken from a vehicle body structure. At least one hinge assembly 74 is provided that includes a flexible attachment between the fixed vehicle body support structure 64 and the collapsible fluid reservoir 62. The hinge assembly 74 includes a hinge assembly anchoring flange 76 that is attached to the fixed vehicle body support structure 64. The hinge assembly 74 further includes a living hinge 78 formed between the arm 73 and the hinge assembly anchoring flange 76. The arrangement of the hinge assembly 74 allows for hinged movement of the collapsible fluid reservoir 62 in relation to the fixed vehicle body support structure 64 in an impact event.

The collapsible fluid reservoir assembly 60 further includes at least one breakaway tab 80. The breakaway tab 80 includes an anchoring flange 82 that is fixedly attached to the fixed vehicle body support structure 64'. A breakaway tab extension 84 is attached to the arm 73' and is preferably although not absolutely integrally formed therewith. A breakaway shear joint 86 is formed between the breakaway tab extension 84 and the anchoring flange 82. The thickness of the breakaway shear joint 86 may be tuned such that a specific load is required to break the breakaway shear joint 86.

Figure 5:
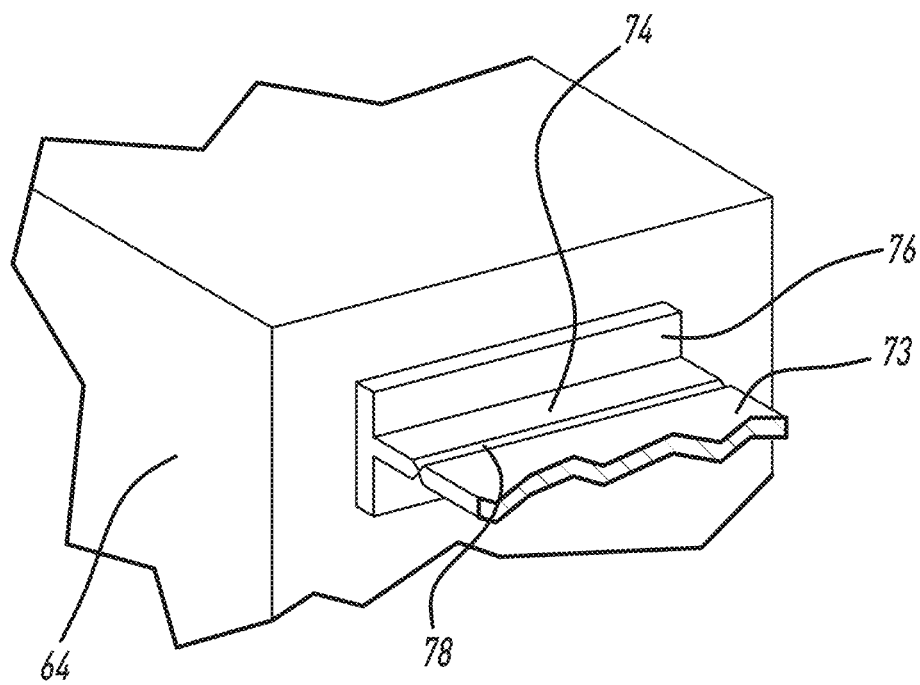
FIG. 5 is a perspective view illustrating a portion of the living hinge of the embodiment of the disclosed inventive concept illustrated in FIG. 4.
Figure 6:
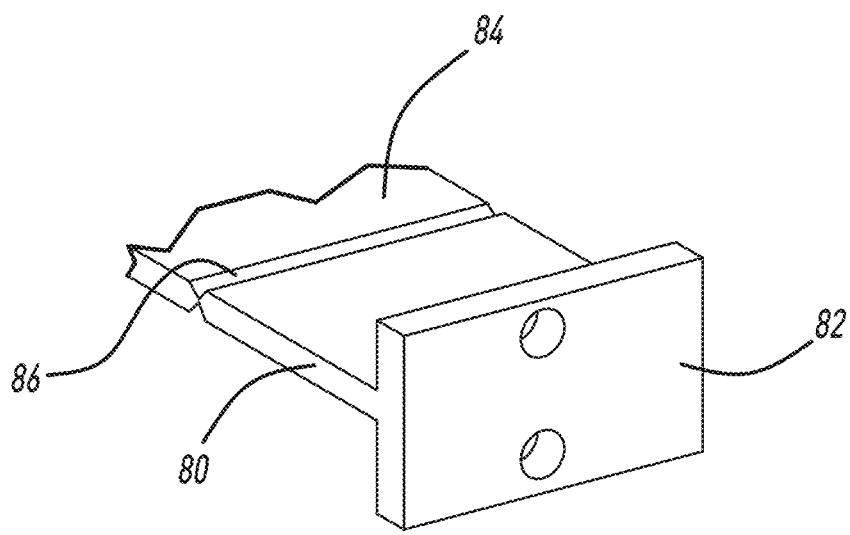
FIG. 6 is a perspective view illustrating a portion of the breakaway hinge of the embodiment of the disclosed inventive concept illustrated in FIG. 4.

FIG. 5 is a perspective view of the hinge assembly 74 in which the living hinge 78 is illustrated in detail. The hinge assembly anchoring flange 76 may be attached to the fixed vehicle body support structure 64 by any number of known methods. FIG. 6 is a perspective view of the breakaway tab 80. As noted, the thickness of the breakaway shear joint 86 may be varied from the thickness illustrated based on, for example, material type to thereby achieve a preferred breakaway load.

In an impact event, the collapsible fluid reservoir 62 is pushed out of its operational, pre-impact event position within the Pedestrian Protection Zone as illustrated in FIG. 4 to a position outside of the Pedestrian Protection Zone. When there is such an event, force is applied to the collapsible fluid reservoir assembly 60 causing the breakaway shear joint 86 to be broken thereby freeing the collapsible fluid reservoir 62 on its one side. Thus disconnected from the fixed vehicle body support structure 64', the collapsible fluid reservoir 62 rotates on the hinge assembly 74 to the post-impact position out of the Pedestrian Protection Zone.

Figure 7:
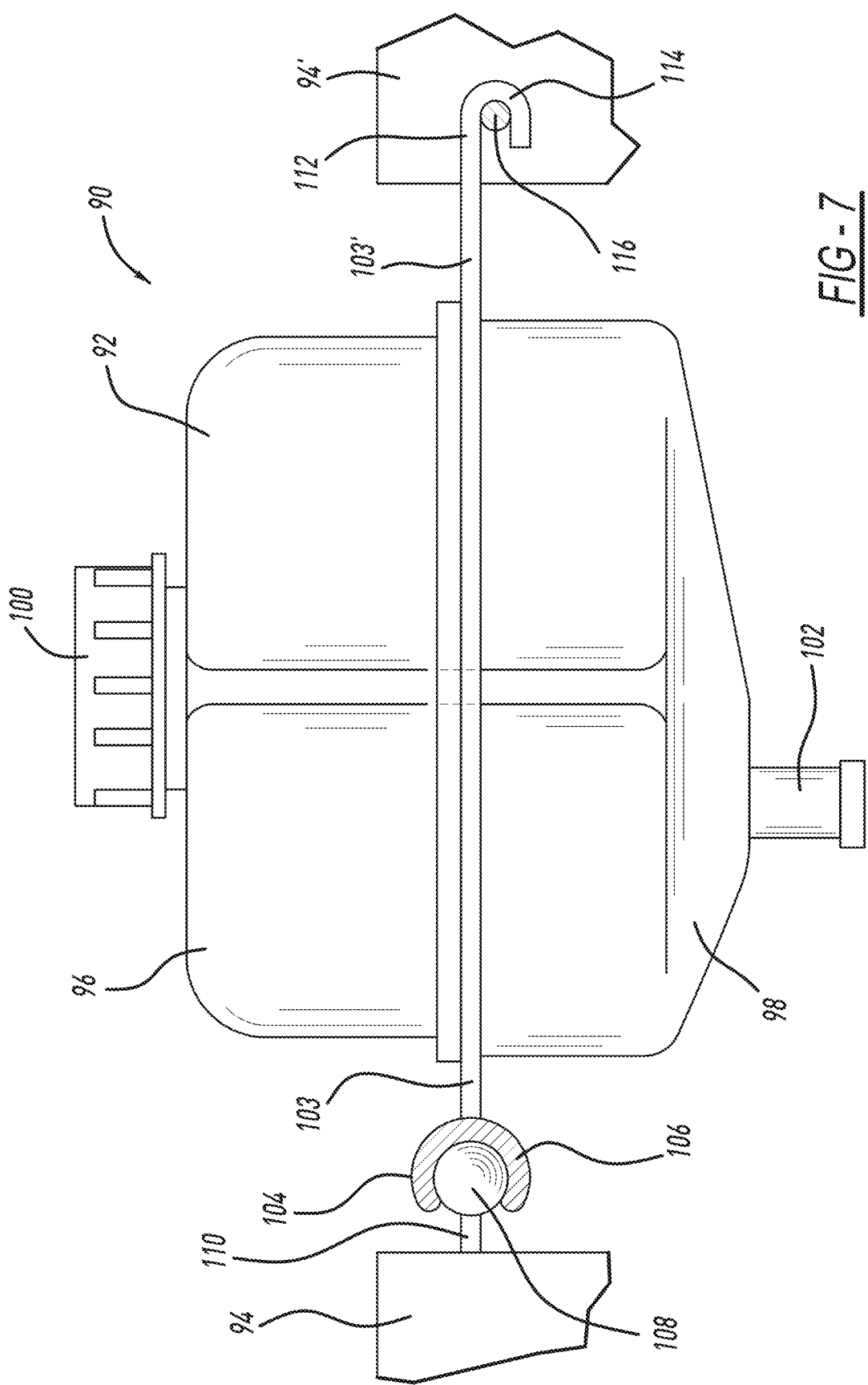
FIG. 7 is a side view of an collapsible fluid reservoir assembly according yet another embodiment of the disclosed inventive concept having a hinged side in the form of a ball-in-socket attached to a vehicle body structure and a breakaway side that includes a breakaway hinge attaching the reservoir to a vehicle body structure.

Referring to FIG. 7, a side view of a collapsible fluid reservoir assembly according to a further embodiment of the disclosed inventive concept is illustrated generally as 90. The collapsible fluid reservoir assembly 90 includes a collapsible fluid reservoir 92 shown in relation to fixed vehicle body support structures 94 and 94'. As with the previous embodiments of the disclosed inventive concept, the vehicle body support structures 94 and 94' may be any of several support structures that include, without limitation, the radiator or the inner surface of the wheel well.

Like the collapsible fluid reservoir 22 shown in FIGS. 2 and 3 and discussed in conjunction therewith, the collapsible fluid reservoir 92 may be of a variety of constructions. For example, the collapsible fluid reservoir 92 may include an upper portion 96 and a lower portion 98 attached to the upper portion 96 by known methods such as welding or adhesives. Also like the collapsible fluid reservoir 22, the collapsible fluid reservoir 92 may be of one-piece construction formed by, for example, blow molding. A reservoir fill inlet 70 is formed as part of the upper portion 66 while a fluid drain 72 is formed as part of the lower portion 68.

A pair of integrally molded arms 103 and 103' extend from the sides of the collapsible fluid reservoir 92. The arms 103 and 103' are illustrated as being formed as part of the lower portion 98 but may alternatively be part of the upper portion 96 or part of both the upper portion 96 and the lower portion 98. The arms 103 and 103' are attached to the collapsible fluid reservoir 92 and may be integrally formed therewith or may be fastened thereto by, for example, mechanical fasteners (not shown).

Like the embodiment of the collapsible fluid reservoir assembly shown in the previously-discussed embodiments of the disclosed inventive concept, the collapsible fluid reservoir assembly 90 includes both a hinge assembly for hinged attachment to a vehicle body structure and a breakaway connector that allows the fluid reservoir to be dropped or broken from a vehicle body structure. At least one hinge assembly 104 is provided that includes a flexible attachment between the fixed vehicle body support structure 94 and the collapsible fluid reservoir 92. The hinge assembly 104 is a ball-and-socket arrangement that includes a socket 106 and a ball 108 captured within the socket 106. The ball 108 is attached to the fixed vehicle body support structures 94 by an arm 110. Alternatively, the ball 108 may be attached to the arm 103 of the collapsible fluid reservoir 92 and the socket 106 may be attached to the fixed vehicle body support structures 94. The arrangement of the hinge assembly 104 allows for hinged movement of the collapsible fluid reservoir 92 in relation to the fixed vehicle body support structure 94 in an impact event.

Figure 8:
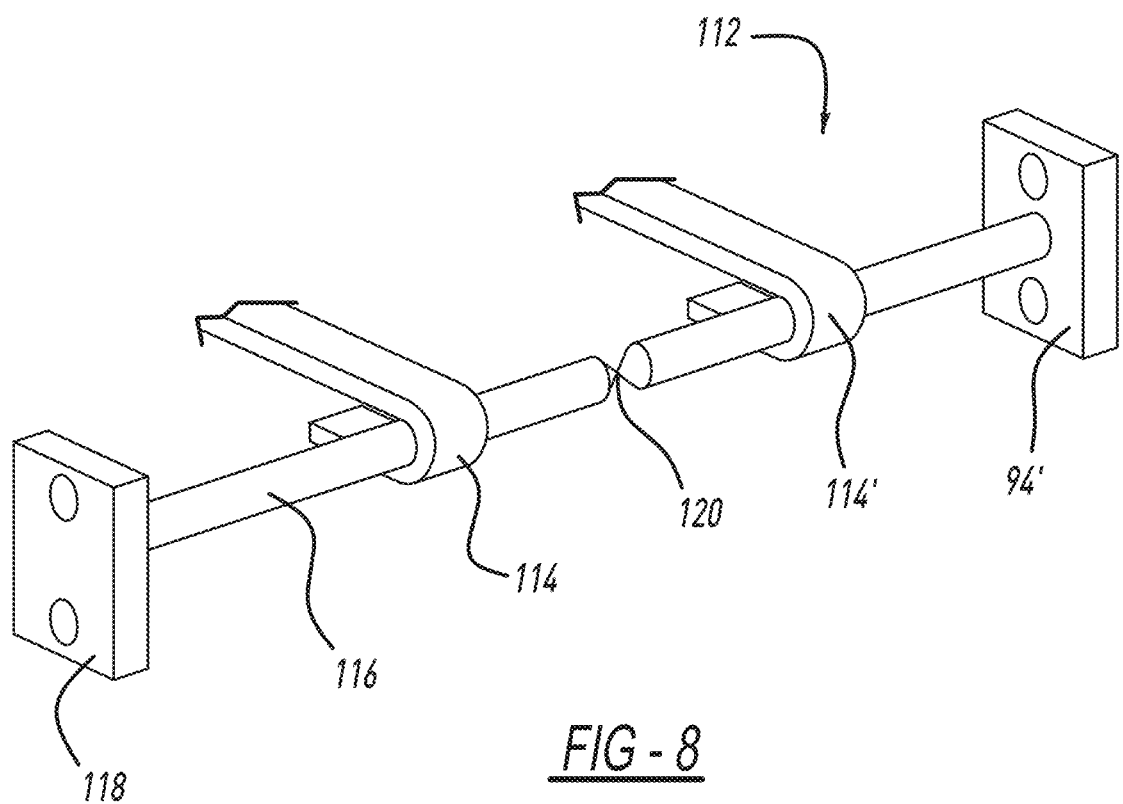
FIG. 8 is a perspective view illustrating a portion of the breakaway hinge of the embodiment of the disclosed inventive concept illustrated in FIG. 7.

The collapsible fluid reservoir assembly 90 further includes at least one breakaway assembly 112. The breakaway assembly 112 includes at least one hooked arm 114 that is attached to the arm 103' of the collapsible fluid reservoir 92. A second arm 114' is illustrated in FIG. 8 which is a perspective view of the breakaway assembly 112. While two arms 114 and 114' are illustrated, it is to be understood that only one arm may be used or more than three arms may be used.

The hooked arms 114 and 114' are hooked to an elongated breakaway hinge pin 116. The elongated breakaway hinge pin 116 is supported by vehicle body structures including the fixed vehicle body structure 94' and a vehicle body structure 118 which may be the same as or different from the fixed vehicle body structure 94'. The elongated breakaway hinge pin 116 includes a necked down area or breakaway shear joint 120 that shears under load. The thickness of the breakaway shear joint 120 may be tuned such that a specific load is required to break the breakaway shear joint 120.

In an impact event, the collapsible fluid reservoir 92 is pushed out of its operational, pre-impact event position within the Pedestrian Protection Zone as illustrated in FIG. 7 to a position outside of the Pedestrian Protection Zone. Force is applied to the collapsible fluid reservoir assembly 90 during such an event to cause the breakaway shear joint 120 to be broken thereby freeing the collapsible fluid reservoir 92 on its one side. Thus disconnected from the fixed vehicle body support structure 94' (and vehicle body structure 118), the collapsible fluid reservoir 92 rotates on the hinge assembly 104 to the post-impact position out of the Pedestrian Protection Zone.

FIGS. 2 through 8 illustrate three hinge assembly embodiments and three breakaway connector embodiments. Each hinge assembly embodiment may be used with a different breakaway connector embodiment in any variety other than the combinations that are illustrated herein.

Thus, the disclosed invention as set forth above overcomes the challenges faced by known fluid reservoir assemblies by reducing vehicle cost while providing a convenient, practical and prompt way to allow movement of the fluid reservoir out of the Pedestrian Protection Zone in an impact event. However, one skilled in the art will readily recognize from such discussion, and from the accompanying drawings and claims that various changes, modifications and variations can be made therein without departing from the true spirit and fair scope of the invention as defined by the following claims.

The invention claimed is:

1. A vehicle cooling system comprising:
   a system support structure;
   a radiator attached to said structure;
   a reservoir attached to said radiator, said reservoir having first and second arms; and
   a hinge assembly between said first arm and said structure and a breakaway connector between said second arm and said structure, whereby said assembly allows said reservoir to be rotated from an operational position before said connector is broken to an impact-responsive position after said connector breakage,
   wherein said hinge assembly includes a pin attached to one of said system support structure or said first arm and a pin-fitting, C-clip snap feature attached to the other of said first arm or said system support structure, said pin-fitting snap feature being rotatably snapped on to said pin.

2. The vehicle cooling system of claim 1, wherein said first and second arms are integrally molded with said reservoir.

3. The vehicle cooling system of claim 1, wherein said breakaway connector includes a breakaway tab having a first end connected to said second arm and a second end connected to said support structure, said breakaway tab further including a breakaway pinched point joining said breakaway tab to said second arm.

4. The vehicle cooling system of claim 1, wherein said breakaway connector includes a breakaway flange connected to said second arm and a breakaway pin attaching said flange to said support structure, said breakaway pin having a relatively thin breakaway neck.

5. The vehicle cooling system of claim 4, wherein said breakaway pin includes a pin head abutting said breakaway flange and a pin anchor, said breakaway neck being formed on said pin anchor.

6. The vehicle cooling system of claim 1, wherein said breakaway connector includes an attachment arm extending from one or the other of the second arm or the support structure and a breakaway pin having a relatively thin breakaway neck attached to the other of said second arm or said support structure.

7. The vehicle cooling system of claim 6, wherein said attachment arm includes a hook for attachment to said breakaway pin.

8. A fluid reservoir for use in a vehicle having a body structure, the reservoir comprising:
   a body;
   first and second arms attached to said body; and
   a hinge assembly between said first arm and the structure and a breakaway connector between said second arm and the structure, whereby said assembly allows rotation of said reservoir from an operational position before said connector is broken to an impact-responsive position after said connector breakage,
   wherein said hinge assembly includes a ball attached to one of said system support structure or said first arm and a socket attached to the other of said first arm or said system support structure, said ball being rotatably attached to said socket.

9. The fluid reservoir of claim 8, wherein said first and second arms are integrally molded with said body.

10. The fluid reservoir of claim 8, wherein said breakaway connector includes a breakaway tab having a first end connected to said second arm and a second end connected to said support structure, said breakaway tab further including a breakaway pinched point joining said breakaway tab to said second arm.

11. The fluid reservoir of claim 8, wherein said breakaway structure includes an attachment arm extending from one or the other of the second arm or the support structure and a breakaway pin having a relatively thin breakaway neck attached to the other of said second arm or said support structure.

12. The fluid reservoir of claim 8, wherein said breakaway connector includes a breakaway flange connected to said second arm and a breakaway pin attaching said flange to said support structure, said breakaway pin having a relatively thin breakaway neck.

13. The fluid reservoir of claim 12, wherein said breakaway pin includes a pin head abutting said breakaway flange and a pin anchor, said breakaway neck being formed on said pin anchor.

14. A fluid reservoir for use in a vehicle having a body structure, the reservoir comprising:
   a body;
   first and second arms attached to said body; and
   a hinge assembly between said first arm and the structure and a breakaway connector between said second arm and the structure, whereby said assembly allows rotation of said reservoir from an operational position before said connector is broken to an impact-responsive position after said connector breakage,
   wherein said breakaway connector includes a breakaway tab having a first end connected to said second arm and a second end connected to said support structure, said breakaway tab further including a breakaway pinched point joining said breakaway tab to said second arm.

\* \* \* \* \*